United States Patent [19]
Fujibayashi et al.

[11] Patent Number: 5,754,276
[45] Date of Patent: May 19, 1998

[54] EXPOSURE CONTROL FOR A READER-PRINTER PROJECTION APPARATUS

[75] Inventors: Kazuo Fujibayashi, Kawasaki; Takayuki Ishihara, Yokohama, both of Japan

[73] Assignee: Canon Kabushiki Kaisha, Tokyo, Japan

[21] Appl. No.: 330,552

[22] Filed: Oct. 28, 1994

[30] Foreign Application Priority Data

Nov. 2, 1993 [JP] Japan ................................. 5-296011

[51] Int. Cl.[6] ........................................... G03B 13/28
[52] U.S. Cl. ................................ 355/45; 355/69; 399/144
[58] Field of Search ............................. 355/67, 69, 243, 355/44, 45; 399/144

[56] References Cited

U.S. PATENT DOCUMENTS

| | | |
|---|---|---|
| 4,474,460 | 10/1984 | Suzuki .................................... 355/55 |
| 4,811,055 | 3/1989 | Hirose .................................... 355/53 |
| 4,970,556 | 11/1990 | Iwata ..................................... 355/214 |
| 5,153,638 | 10/1992 | Sakakibara .............................. 355/55 |
| 5,164,772 | 11/1992 | Andoh .................................... 355/233 |
| 5,270,771 | 12/1993 | Sato ....................................... 355/53 |
| 5,452,047 | 9/1995 | Fujii et al. .............................. 354/402 |

FOREIGN PATENT DOCUMENTS

| | | | |
|---|---|---|---|
| 54-160232 | 12/1979 | Japan | G03B 15/05 |
| 5-273891 | 10/1993 | Japan | G03B 15/22 |

*Primary Examiner*—Fred L. Braun
*Attorney, Agent, or Firm*—Fitzpatrick, Cella, Harper & Scinto

[57] ABSTRACT

An apparatus for projecting an original image onto a screen or a photosensitive drum includes a controller for correcting a light amount of an original illumination lamp along a scanning direction of the original image. A light amount correction value of the controller is changed so that exposure amount distribution on a projected surface becomes a predetermined value in accordance with a magnification detected from a projection lens.

6 Claims, 4 Drawing Sheets

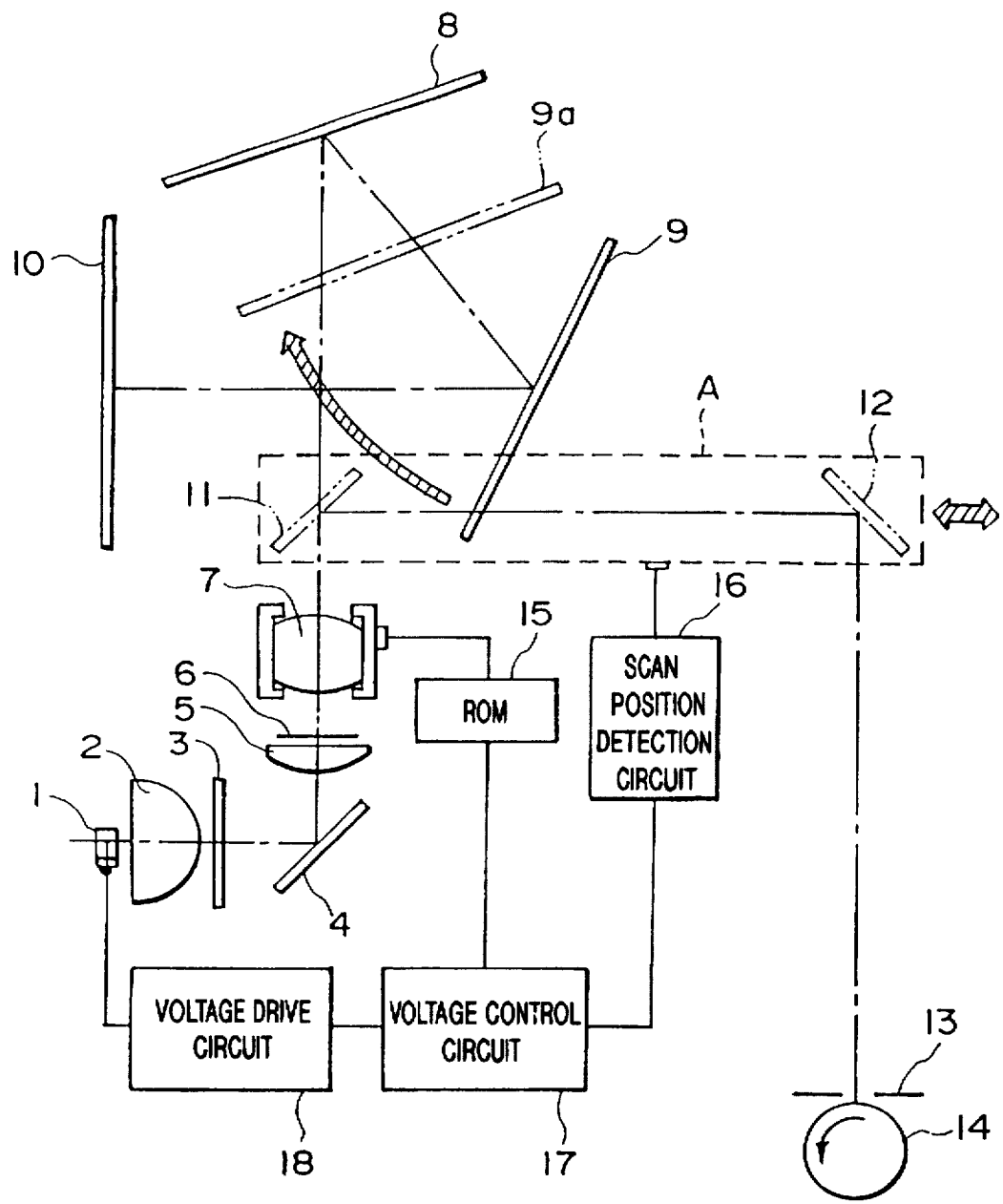
F I G. 1

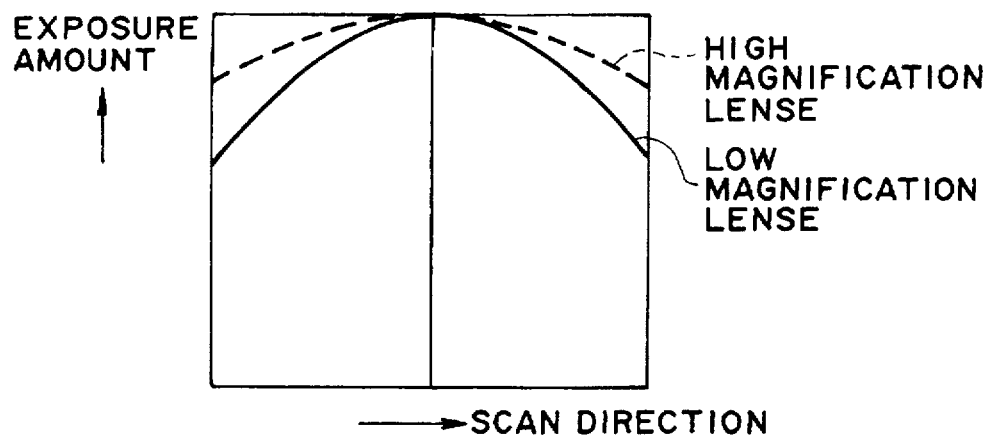
F I G. 2A
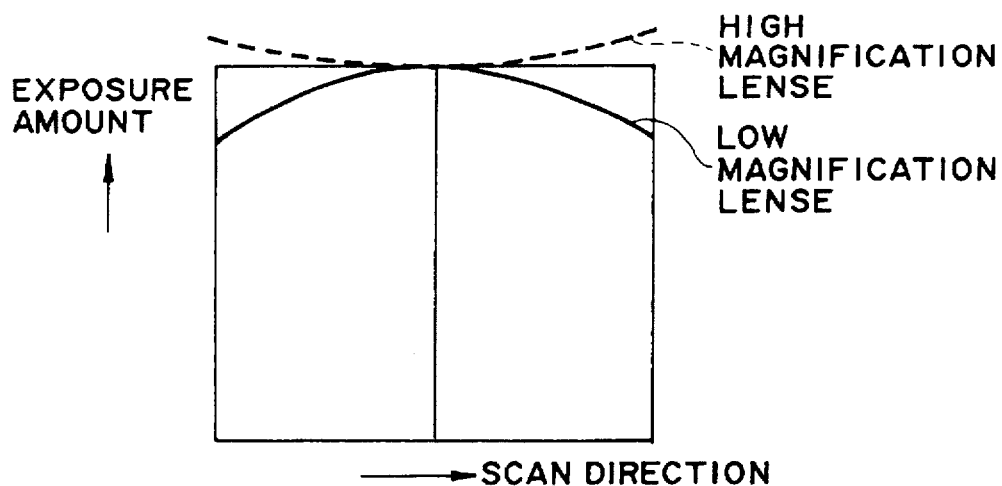
F I G. 2B
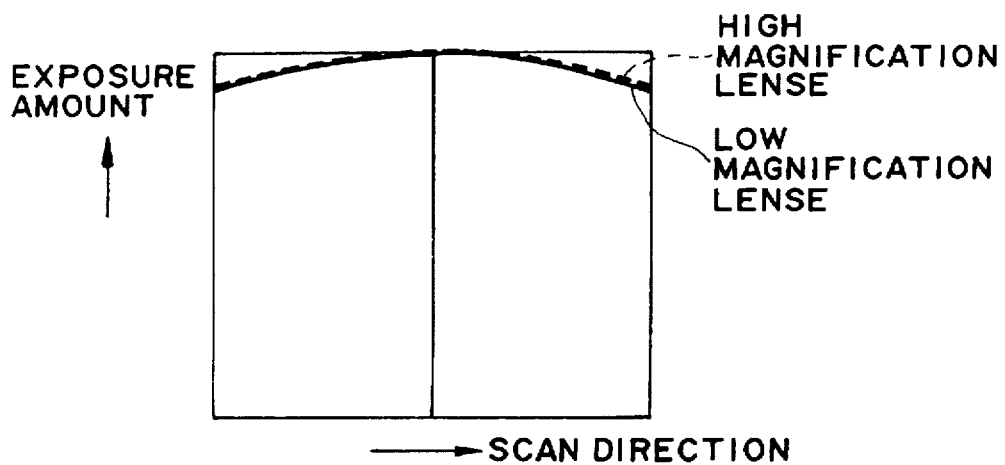
F I G. 2C

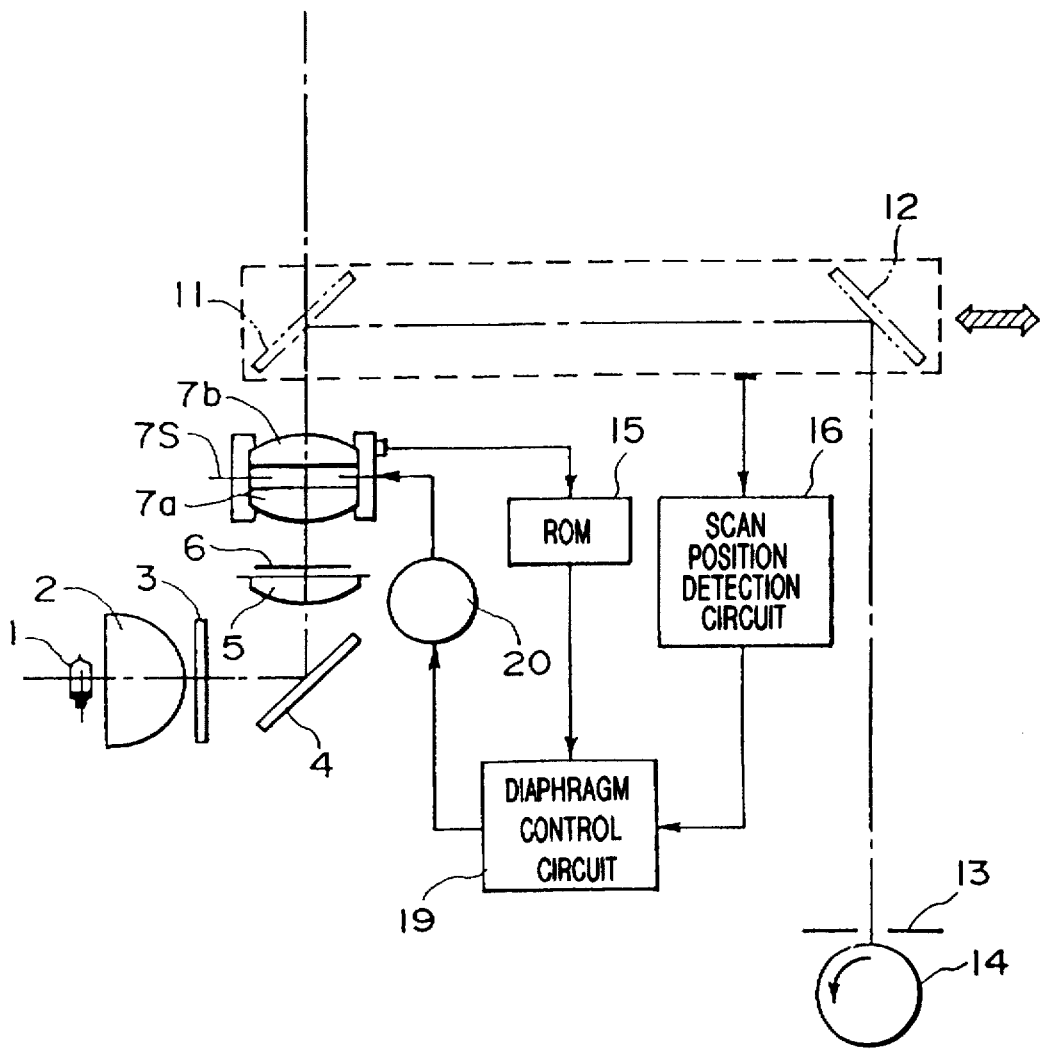
F I G. 3

EXPOSURE CONTROL FOR A READER-PRINTER PROJECTION APPARATUS

BACKGROUND OF THE INVENTION

1. Field of the Invention

The present invention relates to a projection apparatus such as a microreader printer capable of observing and printing an image of a microfilm with an enlarged scale projection and a film projector mounted on a copying machine.

2. Related Background Art

In a conventional microreader printer as a projection apparatus of this kind, a Koehler illumination system is used as an illumination system to minimize photoelectric unevenness as much as possible. Further, the reduction in ambient light amount due to cosine fourth law of a projection lens is corrected by changing slits arranged in the proximity of a photosensitive drum to non-linear configuration and by changing a light amount of a lamp during a scanning operation, thereby correcting the light amount unevenness in the entire image field to some extent.

By the way, the enlargement magnification of the microreader printer is selected to about 7–50 times in consideration of wide usage thereof regarding figures, normal document COM and the like. Since the size of the image to be observed and recorded is constant, the size of the microfilm changes in accordance with the enlargement magnification. That is to say, when the enlargement magnification is small, the size of the film image to be projected becomes great; whereas, when the enlargement magnification is great, the size of the film image becomes small.

However, in the conventional microreader printer, a halogen lamp used as a light source has a tendency to decrease a light amount as the light point goes to a periphery of the illuminated zone of the microfilm due to the light distribution feature of the lamp. Accordingly, even when the Koehler illumination requirement is satisfied, the reduction of an ambient light amount on the projection screen or on the photosensitive drum is varied in accordance with the magnification. Even when the reduction of ambient light amount is corrected by changing the light amount of the lamp, the constant exposure amount cannot be achieved through all of the magnifications.

SUMMARY OF THE INVENTION

The present invention aims to eliminate the above-mentioned conventional drawback, and has an object to provide a projection apparatus wherein constant exposure amount in the entire image area can be obtained regardless of magnification.

In order to achieve the above object, according to the present invention, a projection apparatus for recording an image of an original on a recording medium comprises a light source, a projection lens, and a recording medium. A light amount correction means for correcting a light amount of the light source is arranged in a scanning direction of the original image, and a light amount correction value of the light amount correction means is changed so that exposure amount distribution on a projected surface becomes a predetermined value in accordance with a magnification detected from the projection lens.

In the projection apparatus having the above-mentioned construction, since the light amount correction means for correcting the light amount of the light source is arranged in the scanning direction of the original image and the light amount correction value of the light amount correction means is changed so that the exposure amount distribution on the projected surface becomes the predetermined value in accordance with the magnification detected from the projection lens, the light amount of the light source can be corrected along the scanning direction in accordance with the projection magnification.

BRIEF DESCRIPTION OF THE DRAWINGS

FIG. 1 is a schematic constructural view of a microreader printer according to a first embodiment of the present invention;

FIG. 2A is a graph showing a relation between an exposure amount and a scan direction when a light amount is not corrected, FIG. 2B is a graph showing a relation between an exposure amount and a scan direction when a light amount is uniformly corrected, and FIG. 2C is a graph showing a relation between an exposure amount and a scan direction when a light amount is corrected in accordance with a magnification;

FIG. 3 is a schematic constructural view of a microreader printer according to a second embodiment of the present invention.

DETAILED DESCRIPTION OF THE PREFERRED EMBODIMENTS

Figure 4:
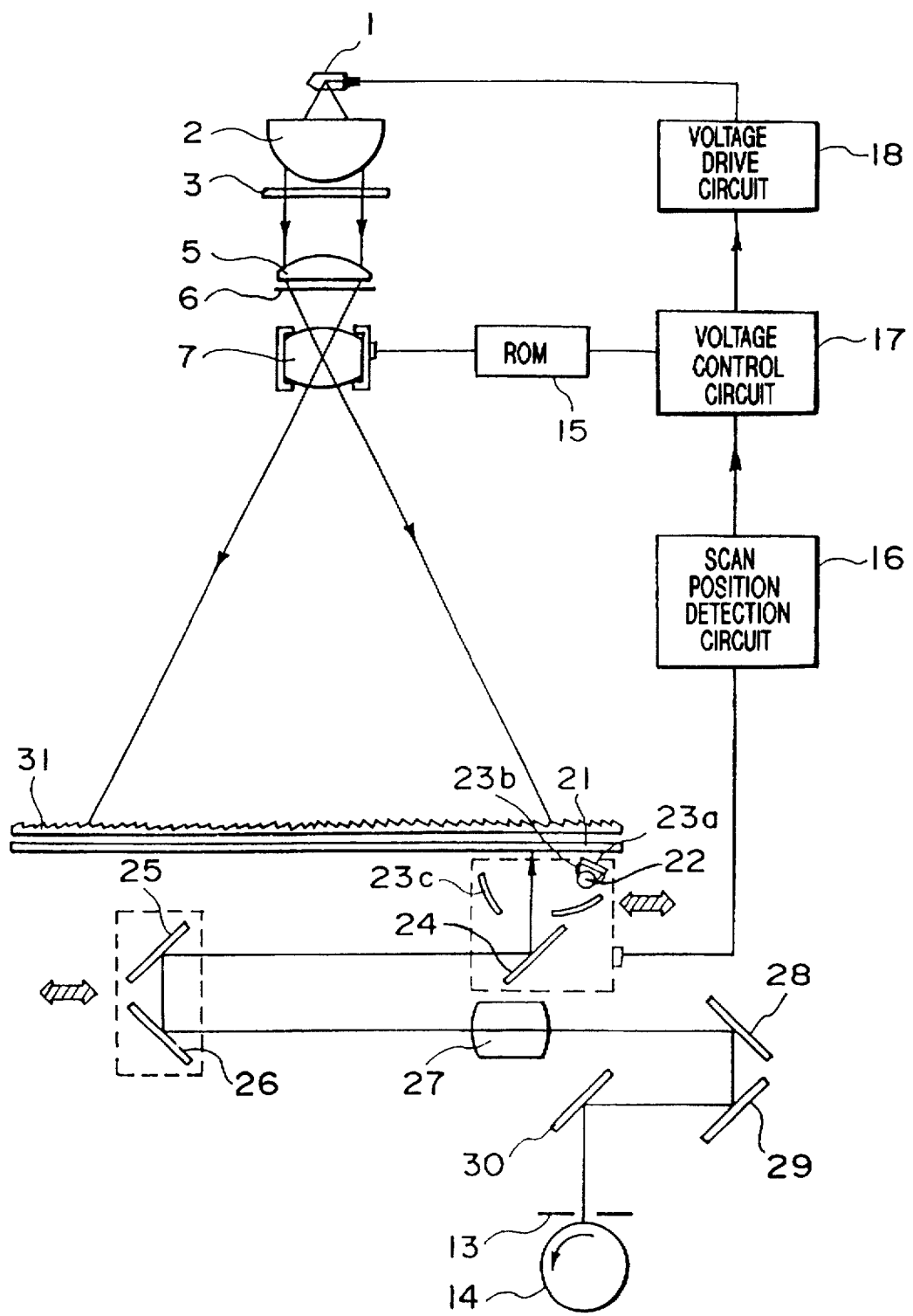
FIG. 4 is a schematic constructural view of a film projector according to a third embodiment of the present invention.

The present invention will now be explained in connection with embodiments thereof with reference to the accompanying drawings.

FIG. 1 shows a first embodiment of the present invention. In FIG. 1, a microreader printer comprises a halogen lamp (referred to merely as "lamp" hereinafter) 1 as a light source, a condenser lens 2, an adiabatic glass 3, a cold mirror 4, a field lens 5, a microfilm 6, a projection lens 7, reader reflection mirrors 8, 9, a screen 10, printer mirrors 11, 12, a slit plate 13, a photosensitive drum 14 as a recording medium, a ROM 15 incorporated into the projection lens 7 and adapted to store magnification information of the projection lens, a scan position detection circuit 16 for detecting a position of a scan mirror unit A including the printer mirrors 11, 12, a voltage control circuit 17 as a light amount correction means for controlling a voltage of the lamp 1, a voltage drive circuit 18 for driving the lamp 1. The projection lens 7 can be exchanged to one of lenses having various magnifications, and each lens has a ROM in which magnification information of that lens is stored so that a magnification signal can be emitted from the ROM.

This first embodiment relates to a microreader printer as an optical system in which an image on the microfilm 6 is projected onto the screen 10 or the photosensitive drum 14 with an enlarged scale by means of the projection lens 7 to be observed or recorded.

Light flux emitted from the lamp 1 is focused on a pupil of the projection lens 7 by the condenser lens 2 and the field lens 5 so that light information regarding the image on the microfilm 6 can effectively be incident to the screen 10 or the photosensitive drum 14. The image is recorded on the photosensitive drum 14 by an electrophotographic technique, and, as is well-known, a charger, a developing means, a transfer means, and a cleaner are arranged around the photosensitive drum.

The adiabatic glass 3 and the cold mirror 4 serve to remove infrared components from the light flux emitted from the lamp 1 to suppress the increase in temperature on the film surface. During a reading operation, a light path is deflected by the reader reflection mirrors 8, 9 to project the image of the microfilm 6 onto the screen 10. On the other hand, during the printing operation, after the reader reflection mirror 9 is retarded to a position 9a, the scan mirror unit A including the printer mirrors 11, 12 is inserted into a light path of the projection lens 7, and the scan mirror unit A is shifted at a constant speed in a direction shown by the arrow in synchronism with the rotation of the photosensitive drum 14, with the result that the image of the microfilm is exposure-scanned on the photosensitive drum 14 in a slit pattern.

The slit plate 13 serves to restrict a light amount exposed to the photosensitive drum 14. As mentioned above, regarding the light amount on the screen 10 or the photosensitive drum 14, there is the tendency that the light amount on the central portion of the projected image is greater than the light amount on the peripheral portion of the image.

This tendency is caused by the cosine fourth law and the light distribution feature of the lamp 1. Although the intensity of light emitted vertically from the lamp 1 is strong, the intensity of light emitted from the lamp is decreased as the light emitting angle is increased. Such light intensity distribution affects an influence upon the microfilm 6 even when the Koechler illumination is used. Since the dimension of the screen 10 has a constant size in connection with the size of the print paper sheet, when the magnification rate is low, the effective projection area of the microfilm 6 becomes great and, when the magnification rate is low, the effective projection area of the microfilm 6 becomes small. Accordingly, the reduction in ambient light amount on the peripheral portion of the screen 10 or the photosensitive drum 14 becomes great in case of a low magnification and becomes small in case of high magnification. In particular, since the projection lens 7 is designed so that an F value is selected to make the microfilm 6 dark in case of low magnification and bright in case of high magnification in order to keep the brightness of the screen 10 constant, there is the tendency that the reduction in ambient light amount due to the light distribution feature of the lamp 1 is emphasized.

FIG. 2A shows a relation between the exposure amount and the scan direction, and particularly shows such tendency regarding the reduction in ambient light amount. In the printing operation, the reduction in ambient light amount must be corrected to keep the exposure amount through the entire image area constant as much as possible in order to cover or compensate the narrowness of the latitude of the photosensitive drum 14. In the past, such correction was effected by controlling the voltage of the lamp 1 with a constant correction value over the entire scan regardless of the magnification. However, since the degree of the reduction in ambient light amount in case of low magnification is not the same as that in case of high magnification, the uniform exposure amount could not be attained (refer to FIG. 2B). That is to say, the exposure amount in the scan direction upon using the high magnification lens greatly differs from the exposure amount in the scan direction upon using the low magnification lens.

To the contrary, in the present invention, when the voltage applied to the lamp 1 is changed via the voltage control circuit 17 and the voltage drive circuit 18 in accordance with the scan position detected by the scan position detection circuit 16 as shown in FIG. 1, the magnification information written in the ROM 15 incorporated into the projection lens 7 is detected, and the voltage change amount for correcting the light amount unevenness is changed by the voltage control circuit 17, thereby always obtaining the constant exposure amount regardless of the magnification (refer to FIG. 2C). That is to say, the exposure amount becomes substantially constant regardless of the magnification.

Next, a second embodiment of the present invention will be explained.

FIG. 3 is a view for explaining the second embodiment. While the exposure amount in the scan direction was corrected by controlling the voltage of the lamp 1 in the first embodiment, according to this second embodiment, the exposure amount in the scan direction is corrected by controlling an aperture of a diaphragm 7s. Incidentally, in FIG. 3, the reference numeral 7a denotes a front half of the projection lens 7, 7b denotes a rear half of the projection lens, 19 denotes a diaphragm control circuit as a light amount correction means, and 20 denotes a motor for driving the aperture of the diaphragm 7s. With this arrangement, the exposure amount can be properly corrected by the diaphragm control circuit 19 and the motor 20 in accordance with the scan position obtained from the scan position detection circuit 16 on the basis of the magnification detected from the ROM 15 incorporated into the projection lens 7.

In this case, the diaphragm control circuit 19 and the motor 20 may be incorporated into the projection lens 7, as well as the ROM 15.

Next, a third embodiment of the present invention will be explained.

Different from the first and second embodiments, in this third embodiment, the present invention is applied to a film projector as an optical system mounted on a copying machine (explanation of the same elements as those in the first embodiment will be omitted). In FIG. 4, the reference numeral 31 denotes a Fresnel lens, 21 denotes an original resting glass plate of the copying machine, 22 denotes a rod-shaped halogen lamp (light source); 23a, 23b, 23c denote illumination reflection mirrors 24, 25, 26, 28, 29, 30 denote copy mirrors, and 27 denotes copy focusing lens. The image of the film 6 is projected on the original resting plate 21 by the projection lens 7.

The enlarged image projected on the original resting glass plate is slit-exposed onto the photosensitive drum 14 through the copy mirrors 24, 25, 26, 28, 29, 30 and the focusing lens 27. In this case, since the rod-shaped halogen lamp 22 used in the reflection of the original is not available, the lamp is turned OFF. The Fresnel lens 31 is used to effectively send the light flux forming the projected image to the focusing lens 27. In the printing operation, the slit-exposure is effected by shifting the copy mirror 24, rod-shaped halogen lamp 22 and illumination reflection mirrors 23a, 23b, 23c together along the original resting glass plate 21 in synchronism with the rotation of the photosensitive drum 14 and by shifting the copy mirrors 25, 26 together at a speed smaller than that of the copy mirror 24 by ½ times.

When the magnification of the film 6 is changed, similar to the microreader printer, since the reduction in ambient light amount is varied with the magnification, the voltage applied to the halogen lamp 22 is changed by the voltage control circuit 17 in response to the scanning movement on the basis of the magnification information from the ROM 15 incorporated into the projection lens 7.

As mentioned above, according to the present invention, since there is provided the light amount correction means for correcting the light amount along the scan direction and the light amount correction value of the light amount correction means is changed to bring the exposure amount distribution on the projected image to the predetermined value in accordance with the magnification detected from the projection lens, the light amount of the light source can be corrected along the scan direction in response to the magnification, thereby always obtaining the uniform exposure amount over the entire image area regardless of the magnification.

What is claimed is:

1. A projection apparatus for recording an image on an original onto a recording medium, comprising:

illumination means for illuminating the original;

projection means for projecting an image of the illuminated original onto a projection surface;

magnification setting means for setting one of a plurality of projection magnifications of the image;

a scan member movable in a direction transversing an optical axis of said projection means for scanning the image to slit-expose it onto the projection surface in each of the set projection magnifications;

position detection means for detecting a position of said scan member when moving in the direction transversing the optical axis throughout movement thereof, and outputting a position signal indicating the position of said scan member; and control means for controlling an exposure amount of the recording medium by said illumination means based on the magnification set by said magnification setting means and the position detected by said position detection means, to thereby correct the exposure amount of the recording medium in the moving direction of said scan member in each of the set projection magnifications.

2. A projection apparatus according to claim 1, wherein said projection means includes a lens for projecting an image, said magnification setting means setting the magnification of said lens.

3. A projection apparatus according to claim 1, wherein said scan member includes a mirror movably disposed on the optical path.

4. A projection apparatus according to claim 3, wherein the recording medium includes a photosensitive drum which rotates in sync with the shifting of said mirror.

5. A projection apparatus according to claim 1, wherein said illumination means includes a lamp whose light emitting amount is controlled by said control means.

6. A reader printer, comprising:

illumination means for illuminating a film;

a first optical system for projecting an image of the illuminated film onto a screen;

a second optical system for projecting the image of the illuminated film onto a recording medium, and including a scan member disposed movably on an optical path;

magnification setting means for setting one of a plurality of projection magnifications of the image;

position detection means for detecting a position of said scan member; and control means for changing an illumination light amount of the film by said illumination means based on the projection magnification set by said magnification setting means and the position of said scan member throughout movement thereof detected by said position detection means in each of the set projection magnifications.

* * * * *

UNITED STATES PATENT AND TRADEMARK OFFICE
CERTIFICATE OF CORRECTION

PATENT NO. : 5,754,276

DATED : May 19, 1998

INVENTOR(S) : Fujibayashi et al.

It is certified that error appears in the above-identified patent and that said Letters Patent is hereby corrected as shown below:

SHEET 2:

FIGS. 2A, 2B and 2C, "LENSE" (all occurrences) should read --LENS--.

COLUMN 2:

Line 3, "is" should read --in--.

Signed and Sealed this

Sixteenth Day of March, 1999

Attest:

Q. TODD DICKINSON

Attesting Officer

Acting Commissioner of Patents and Trademarks